Aug. 15, 1933.  G. B. WEAVER ET AL  1,922,338
STREET SWEEPER
Filed Dec. 16, 1931   3 Sheets-Sheet 3
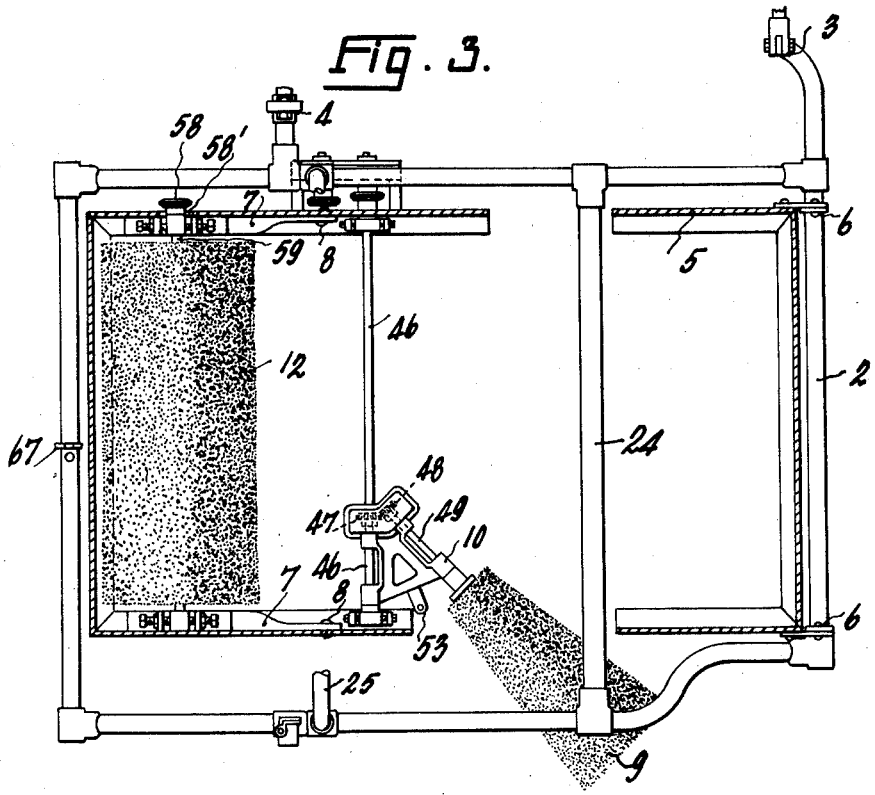
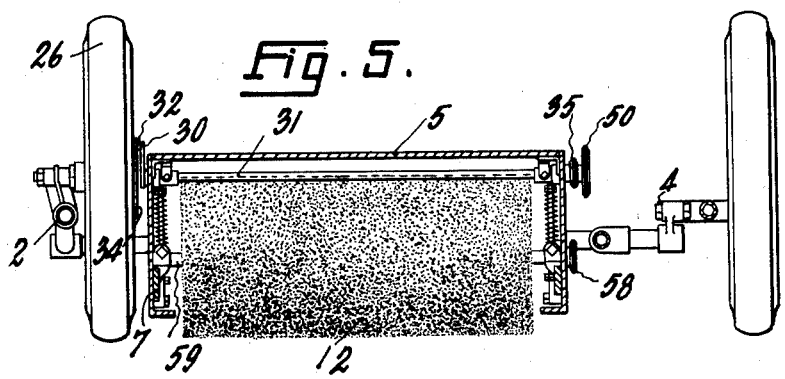
INVENTORS
GEORGE B. WEAVER
WILLIAM J. KNAUT
BY Chapin & Neal
ATTORNEYS.

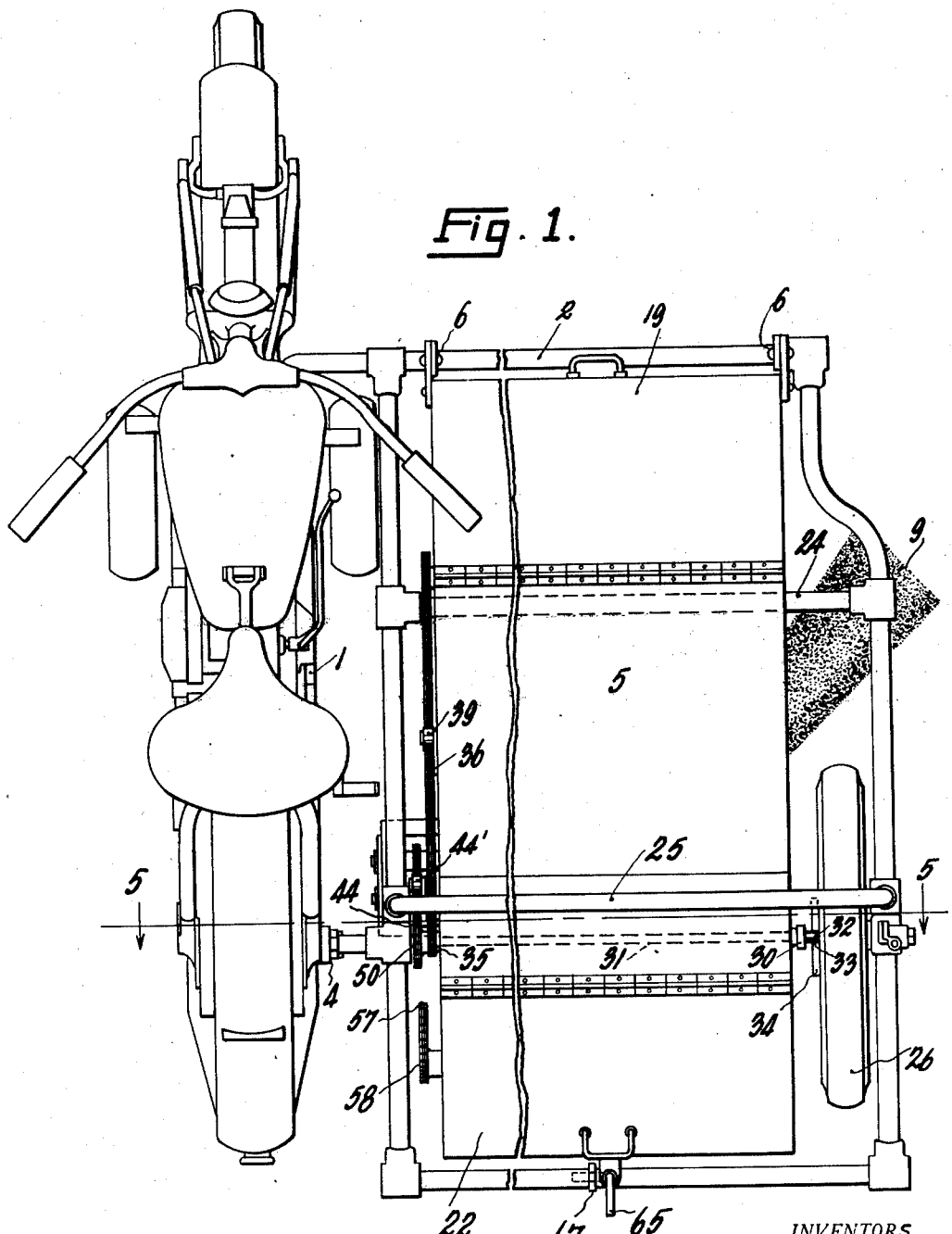

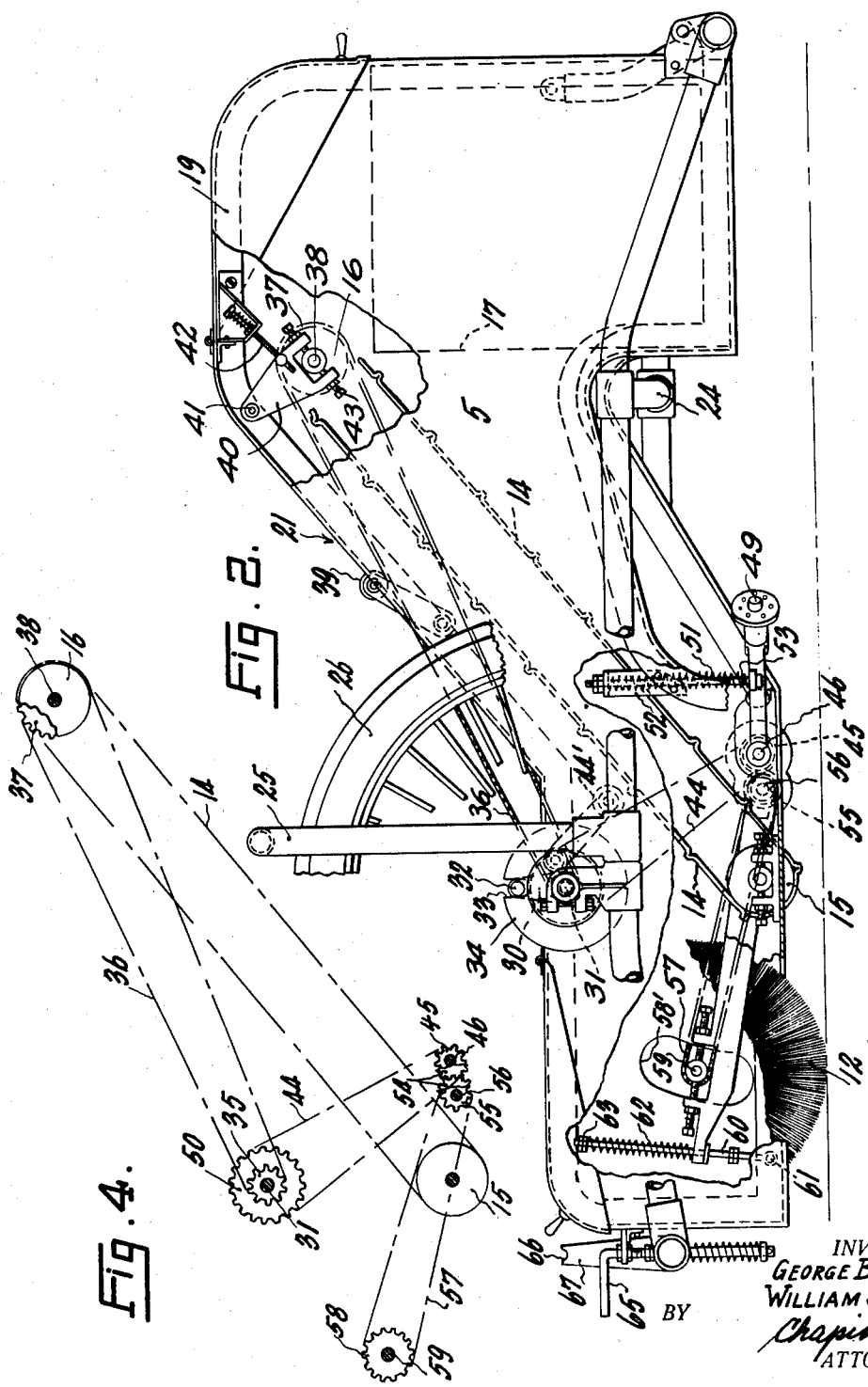

Patented Aug. 15, 1933

1,922,338

UNITED STATES PATENT OFFICE 1,922,338

STREET SWEEPER

George B. Weaver, Springfield, Mass., and William J. Knaut, New Haven, Conn., assignors to Indian Motorcycle Company, Springfield, Mass., a Corporation of Massachusetts Application December 16, 1931
Serial No. 581,398

8 Claims. (Cl. 15—84)

This invention relates to motor driven street sweepers and has as an object the provision of a sweeper of this character which may be constructed and operated in a manner to secure the economies in manufacture and maintenance of a motorcycle and side car assembly. A further object is to provide a device of this character which shall be simple and sturdy in construction and so arranged as to afford greater mobility and ease of handling than have prior sweepers, and one which may be operated closely adjacent a curb to secure an effective cleaning of the gutter.

In the accompanying drawings which illustrate one embodiment of the invention:

Fig. 1 is a plan view showing the general assembly, parts being broken away;

Fig. 2 is a side view, parts being broken away;

Fig. 3 is a plan view, partly in section, showing the frame arrangement, the operating mechanism being omitted;

Fig. 4 is a detail side view showing the driving mechanism; and

Fig. 5 is a sectional view substantially on line 5—5 of Fig. 1.

In the drawings, 1 indicates generally the frame of a motorcycle which may be of conventional construction. At 2 is shown the main frame of the side car sweeper which is secured to the motorcycle at 3 and 4 in substantially the same manner as are conventional side cars. A secondary or sweeper frame 5 of generally box-like construction is pivotally mounted as at 6 to the forward cross member of the main frame 2, and is adjustably secured at the rear end to the rear cross member of the main frame as later to be more fully described. The main rotary brush 12 of the device is rotatably mounted in an auxiliary brush frame 7 which is pivoted as at 8 to the secondary or sweeper frame. An angularly positioned brush 9, in the shape of a truncated cone, is also carried by the secondary frame in a pivoted auxiliary frame 10. It will be seen that by the frame arrangement described, the sweeper as a whole may be rigidly attached, or detached, side car fashion, to the motorcycle; that the secondary frame has a pivotal attachment to the main side car frame, permitting the rear end of the sweeper to be raised or lowered to position the brushes in operative or inoperative position; and that the auxiliary frame 7 permits movement of the brush relative to the secondary frame to accommodate road obstructions without requiring movement of the secondary frame.

The material swept up by the brush 12 is swept onto a conveyor belt 14 carried on pulleys 15 and 16 which discharge the material into a receptacle 17 carried in the forward open end of frame 5. Conveyor belt 14 is formed with sewed pleats 14' to form carrying elements on the belt. The frame 5, as previously stated, is in the form of a box and is provided with a cover portion 19 overlying the receptacle 17 and hinged to the body of the frame at 20. As best shown in Fig. 2, the box-like sweeper frame 5 is sloped downwardly as at 21, the rear portion 22 being of a height to accommodate the brush 12. The cover portion 22 is hinged to give access to the brush. The frame 5 is arched at the bottom as at 23 to accommodate the angularly positioned auxiliary brush 9 as well as to permit the passage of a cross brace 24 of the frame 2. The frame 2 also includes a cross brace 25 which is arched over the side car wheel 26 and across the top of the rear portion 22 of the frame 5.

The brushes 12 and 9 and belt 14 are driven from the side car wheel 26 by means of a crank 30, secured to a shaft 31 journaled in the frame 5, and provided with a pin 32 engaging in a slot 33 formed in the brake drum 34 of the wheel. The shaft 31, at the end opposite crank 30, is provided with a sprocket 35 connected by a sprocket chain 36 to a sprocket 37 secured to the shaft 38 of pulley 16, whereby the conveyor belt 14 is driven when the car is in motion. Shaft 38 is journaled in hangers 40 secured to the frame 5 at 41, the hanger being made adjustable as at 42 and the bearings of shaft 38 being made adjustable as at 43. A spring actuated roll 39 maintains the tautness of the chain.

A second sprocket 50 is secured to drive shaft 31 and is connected by chain 44 to a sprocket 45 secured to a shaft 46 journaled in the frame 5. A tightening roll 44' similar to 39 is provided for chain 44. Shaft 46 carries a bevel gear 47 meshing with a bevel gear 48, secured to shaft 49 of the brush 9, to drive the said brush. The shaft 49 is journaled in frame 10, which is pivoted on shaft 46 and is yieldingly held in a horizontal position by a spring 51 engaging between frame 10 and a lug 52 secured to frame 5, spring 51 being positioned on a rod 53 secured to frame 10 and passing through lug 52. Shaft 46, through gearing 54, also drives a sprocket 55 mounted on shaft 56 on the axis of which auxiliary brush frame 7 is pivoted, and the brush 12 is driven by a chain 57 which passes around sprocket 55 and a sprocket 58 secured to the shaft 59 of the brush, which extends through an arcuate slot 58' in frame 5. By this arrangement, the movement of brush 12 and its frame 7 as the brush passes over road obstructions does not interfere with the drive of the brush. The free end of frame 7 is connected to the frame 5 by means of rods 60 pivoted at one end to the frame as at 61 and passing freely through apertures formed in the ends of the side members of frame 7, springs 62 being positioned on the rods between said frame members and nuts 63 on the upper ends of the rods to cushion the upward movement of the frame 7.

It will be seen that with the car in motion, the brushes are rotated to sweep the pavement over which the vehicle is driven, the angularly positioned brush 9 sweeping the area in front of the side car wheel and directing the sweepings into the path of the main brush permitting operation of the sweeper closely adjacent the curbs to efficiently clean the gutters.

The brushes and belt are normally continuously driven whenever the car is in motion, but the pivotal connection of the sweeper frame 5, at its forward end, to frame 2 permits the rear end of frame 5 to be raised to position the brushes 9 and 12 clear of the roadway when it is desired to suspend the sweeping operation. The frame may be held in this raised inoperative position by means of a spring catch 65 secured to the rear end of frame 5 and which may be swung into engagement with an elevated seat 66 formed on a bracket 67 secured to frame 2, as indicated in dotted lines in Fig. 1. When the frame 5 is thus raised, pin 32 is raised out of engagement with slot 33, thus disconnecting the drive shaft 31 from the side car wheel. Operation of the sweeper is thus suspended until the frame is again lowered, when pin 32 rides on the drum 34 until it encounters the slot 33 and operation of the sweeper is resumed.

What we claim is:

1. In combination a motorcycle provided with a side car including a supporting frame and street sweeping mechanism operatively mounted in said side car frame.

2. In a street sweeping combination which includes a motorcycle and a side car having street sweeping mechanism carried by the side car; means for driving the street sweeping mechanism from the wheel of the side car and means for rendering said drive inoperative.

3. In a street sweeping combination which includes a motorcycle and a side car having street sweeping mechanism carried by the side car; a support for the sweeping mechanism comprising a box-like frame hinged at its forward end to the side car frame, for upward and downward movement with respect thereto, and means to automatically connect the sweeper mechanism in driven relation with the wheel of the side car when the box-like frame is in lowered position and to automatically disconnect said sweeper mechanism from the side car wheel when said box-like frame is in raised position.

4. In a street sweeping combination which includes a motorcycle and a side car having street sweeping mechanism carried by the side car; a support for the sweeping mechanism comprising a box-like frame hinged at its forward end to the side car frame for upward and downward movement with respect thereto, a drive shaft for the sweeping mechanism journaled in said box-like frame, a crank formed on the end of said shaft, a radial slot formed in the brake drum of the side car wheel in which slot said crank is adapted to engage, when the box-like frame is in lowered position, to be driven by said wheel.

5. A street sweeper in the form of a side car attachable to a motorcycle which comprises, a main frame on which the wheel of the side car is mounted, a sweeper frame pivoted at its forward end to the main frame for vertical movement with respect thereto, a rotatable brush pivoted to the sweeper frame and positioned transversely of and at the rear of the side car within said main frame, a second rotatable brush pivoted to the sweeper frame and positioned in front of the side car wheel at an angle to the first named brush, and means to drive both brushes from the side car wheel when the sweeper frame is in lowered position.

6. In a street sweeper which comprises a motorcycle including a side car frame having a wheel mounted on the side car frame substantially opposite the rear wheel of the motorcycle and provided with brake mechanism including a brake drum, sweeping mechanism carried by the side car frame, a crank for driving the sweeper mechanism, a radial slot in the brake drum in which said crank is adapted to engage to drive the sweeper mechanism from the wheel and means to disengage the crank from the slot to interrupt the operation of the sweeper mechanism.

7. A street sweeper which comprises a motorcycle including a side car frame having a wheel mounted on said frame substantially opposite the rear wheel of the motorcycle, a secondary frame mounted within and pivoted at its forward end to the side car frame, a receptacle mounted in the forward end of the secondary frame, an auxiliary frame pivoted to the rear portion of the secondary frame and carrying a rotatable sweeping brush positioned transversely of the secondary frame, a conveyor for receiving the sweepings from said brush and discharging them into said receptacle, a second auxiliary frame pivoted to the secondary frame and carrying a second rotatable brush in the form of a truncated cone extending horizontally outwardly of the side car frame and in front of the side car wheel, said last named brush being positioned to direct its sweepings into the path of the first named brush, and means to drive both said brushes and said conveyer from the side car wheel when the secondary frame is in its lower pivotal position with respect to the side car frame.

8. A street sweeping combination which comprises a motorcycle and street sweeping mechanism in the form of a side car secured to said motorcycle, said sweeping mechanism including a rotating brush and means to drive said brush from the wheel of the side car.

GEORGE B. WEAVER.
WILLIAM J. KNAUT.

CERTIFICATE OF CORRECTION.

Patent No. 1,922,338.　　　　　　　　　　　　　　　　August 15, 1933.

GEORGE B. WEAVER, ET AL.

It is hereby certified that the name of the assignee in the above numbered patent was erroneously written and printed as "Indian Motorcycle Company" whereas said name should have been written and printed as Indian Motocycle Company, as shown by the records of the case in this office; and that the said Letters Patent should be read with this correction therein that the same may conform to the record of the case in the Patent Office.

Signed and sealed this 5th day of December, A. D. 1933.

F. M. Hopkins (Seal)　　　　　　　　　　　　　　　　Acting Commissioner of Patents.